(12) United States Patent
Kaneko

(10) Patent No.: US 6,412,434 B1
(45) Date of Patent: Jul. 2, 2002

(54) SMALL WATERCRAFT HULL CONSTRUCTION

(75) Inventor: Yoshiyuki Kaneko, Iwata (JP)

(73) Assignee: Yahama Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/676,037

(22) Filed: Sep. 28, 2000

(30) Foreign Application Priority Data

Sep. 28, 1999 (JP) .......................................... 11-274736

(51) Int. Cl.[7] ................................................ B63B 1/00
(52) U.S. Cl. ........................ 114/271; 114/670; 114/271
(58) Field of Search ................................ 114/284, 285, 114/291, 271, 67 A, 67 R, 55.5; 440/38

(56) References Cited

U.S. PATENT DOCUMENTS

| | | | | |
|---|---|---|---|---|
| 1,050,517 A | * | 1/1913 | Chase | .......................... 114/291 |
| 1,824,313 A | * | 9/1931 | Vogler | .......................... 114/291 |
| 4,231,314 A | | 11/1980 | Peters | |
| 4,393,802 A | | 7/1983 | Rizzo | |
| 4,903,626 A | | 2/1990 | Haines | |
| 5,490,474 A | | 2/1996 | Ikeda | |
| 5,540,174 A | | 7/1996 | Kishi et al. | |
| 5,619,950 A | | 4/1997 | Ikeda | |
| 5,787,829 A | * | 8/1998 | Oshima | .................... 114/67 A |

* cited by examiner

*Primary Examiner*—Ed Swinehart
(74) *Attorney, Agent, or Firm*—Knobbe, Martens, Olson & Bear LLP

(57) ABSTRACT

A hull for a planing type watercraft has a rear portion that includes one or more steppers and a step plate fixed to the hull rearward of the first stepper so as to create a gap between a leading end of the step plate and the corresponding stepper. The step plate may additionally include longitudinally extending channels. The gap may further include apertures to supply air to the gap.

26 Claims, 8 Drawing Sheets

SMALL WATERCRAFT HULL CONSTRUCTION

PRIORITY INFORMATION

The present application is based upon and claims priority to Japanese Patent Application No. 11-274736, filed Sep. 28, 1999, the entire contents of which is hereby incorporated by reference.

BACKGROUND OF THE INVENTION

1. Field of the Invention

The present invention relates to small watercraft, and in particular to a hull construction for a small watercraft.

2. DESCRIPTION OF THE RELATED ART

Personal watercraft have become very popular in recent years. A personal watercraft is designed to be operated by a rider who sits in a straddle-like fashion at a central position on the watercraft. Some personal watercrafts also have seating for one or two passengers. For this purpose, the personal watercraft includes an upper deck section with an elongated bench which the rider and passengers straddle. The deck also includes foot areas that extend along both sides of the bench.

Over the past few years, a lower section of the personal watercraft hull has steadily evolved in an effort to optimize the speed and the handling of the small watercraft. The hull lower section now commonly has a deep "V" shape and often includes one or more inner chines or strakes between a keel line of the hull and the outer chines. The lower hull section is designed such that the watercraft planes or rides on only a portion of the lower hull section's surface area at the aft end of the watercraft. The wetted area of the watercraft hull (i.e., the portion of the watercraft hull in contact with the water) desirably is small in comparison to the total surface area of the hull lower section in order to reduce drag on the watercraft. For this purpose, the watercraft's bow rises out of the water to reduce the wetted area when the watercraft is planing.

The angle formed between the bow and the surface of the body of water in which the watercraft is operated affects the drag or resistance experienced by the watercraft hull as it planes over the water surface. This angle is often referred to as the planing angle of the watercraft. Too large or small of an angle significantly increases drag on the watercraft hull. An optimal planing angle therefore exists in order to minimize drag on the watercraft.

Prior hulls, however, most often are designed to raise the watercraft hull to a smaller than the optimum planing angle for the watercraft in order to minimize pitching of the watercraft. Prior watercrafts tend to pitch severely when planing with the bow raised to the optimum-planing angle. That is, the bow of the watercraft tends to bounce up and down with the bow raised out of the water to the desired planing angle. This condition is commonly referred to as "porpoising" and produces a very uncomfortable ride. In addition, watercraft speed suffers because bow porpoising increases the drag on the watercraft. At a smaller angle, the watercrafts does not porpoise to a meaningful extent; however, drag on the watercraft increases with a smaller angle as compared with the planing optimum angle if it could be maintained.

A recent hull design included a stepper at the aft end of the hull in order to improve the stability of the watercraft when planing at the desired planing angle. A stepper is a vertical rise in the hull surface, as will be explained below in detail. The stepper reduces the wetted surface of the watercraft hull while effectively elongating the hull in order to improve the stability of the watercraft.

Recent designs have included a pair of steppers and a rounded transom in order to further stabilize the watercraft when up on plane and thereby inhibit porpoising of the watercraft when running at high speeds. Such an aft hull design further reduces the wetted area of the watercraft hull when up on plane, while supporting the aft end of the deck and providing buoyancy at the watercraft aft end when in a static state. The dual stepper hull design also provides a rocker effect that permits the rider to pull the watercraft bow up earlier when jumping, for improved watercraft handling.

SUMMARY OF THE INVENTION

The present hull configuration incorporates a pair of stepper area plates (step plates) attached to the first stepper area in such a manner as to create a gap between the first stepper and the leading end of each step plate. The gap has an outer end portion that terminates towards the lateral side of the hull to allow communication with atmospheric air. When the watercraft is up on plane, the opening is preferably above the water surface and atmospheric air is drawn into the opening by the venturi action from water passing over the gap. The drawn-in air mixes with the water passing over the step plate and has the effect of reducing the drag on the rear portion of the hull. In one mode, longitudinal channels are provided on the step plate to increase the air drawn into the opening while decreasing the plate surface area to further reduce drag. In an additional mode, the amount of drawn air is increased or supplied by providing at least one supplemental aperture in the downward facing surface of the gap. A hose is connected to the aperture and communicates with the atmosphere (e.g., the air within the engine compartment). The placement of the inlet portion of the hose inhibits the entry of water into the hose to maximize supplemental drawn air and further reduce drag.

Thus, in accordance with one aspect of the present invention, a hull for a planing-watercraft includes a pair of inclined sections arranged generally in a v-shape. The inclined sections extend generally along a longitudinally extending central axis from a front portion of the hull toward a rear portion of the hull. The hull further includes at least a first arrangement of surfaces. The first arrangement of surfaces includes a first surface and a second surface. The second surface is positioned rearward of the first surface so as to create a gap between the first and second surfaces. The gap extends from an outer portion of the surfaces to an inner portion of the surfaces in a lateral direction that is generally normal to the centerline of the hull.

Another aspect of the present invention involves a jet propelled watercraft comprised of a hull and a jet propulsion unit that is mounted in the hull and has a downwardly facing water inlet opening through which water is drawn. The jet propulsion unit further includes a discharge nozzle. The hull is comprised of an upper deck and a lower hull with an engine compartment defined at least in part within the lower hull. The lower hull including a first arrangement of surfaces that is disposed rearward of the water inlet opening. The first arrangement of surfaces includes a first surface and a second surface. The second surface is positioned rearward of the first surface so as to create a gap between the first and second surfaces. The lower hull also includes a source of air communicating with the gap. In one mode, the source of air is provided by the outer lateral end of the gap extending toward and preferably proximate to a lateral side of the hull so as to be above the water surface level when the watercraft is up on plane. Air is drawn through this open end of the gap by the venturi effect. In other modes, the source of air can include one or more air supply apertures communicating with the gap.

An additional aspect of the present invention involves a step plate for use on a planing watercraft hull. The hull being of the type that has at least one stepper formed in a lower portion of the hull, at least one stepper area formed on an aft side of the stepper, and a ride plate mounted to the hull in a central rearward location. The step plate has at least one longitudinally extending channel. The step plate also is mounted to the stepper area on either side of the ride plate.

Further aspects, features and advantages of the present hull construction will become apparent from the description of the preferred embodiments of the hull that follow.

BRIEF DESCRIPTION OF THE DRAWINGS

These and other features and aspects of the invention will now be described with reference to the drawings of several preferred embodiments of the invention, which are intended to illustrate and not to limit the invention. The drawings contain the following figures.

DETAILED DESCRIPTION OF THE PREFERRED EMBODIMENT

Figure 1:
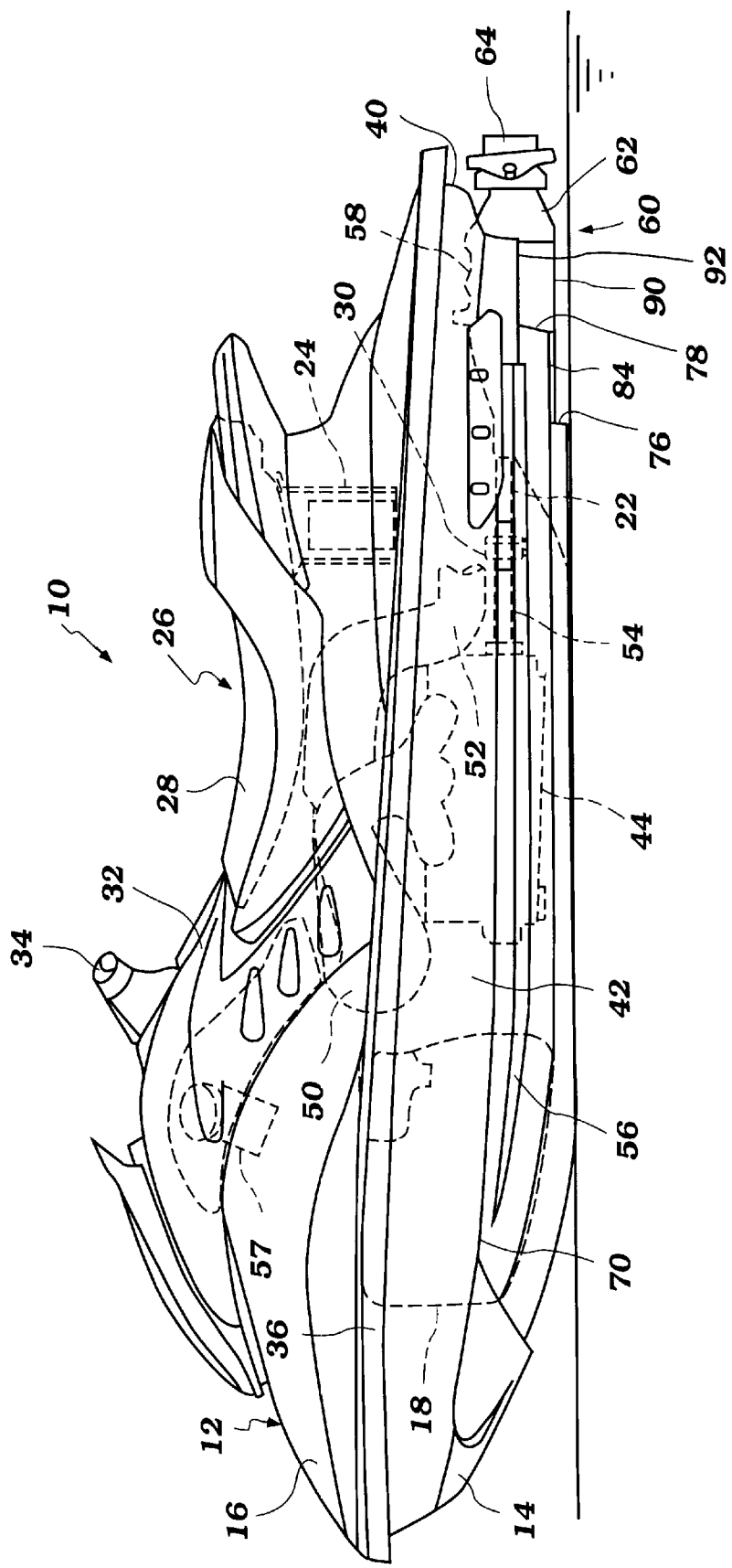
FIG. 1 is a side elevational view of a personal watercraft constructed in accordance with a preferred embodiment of the present invention, and several of the internal components of the watercraft are illustrated in phantom (e.g., an engine of the watercraft)
Figure 2:
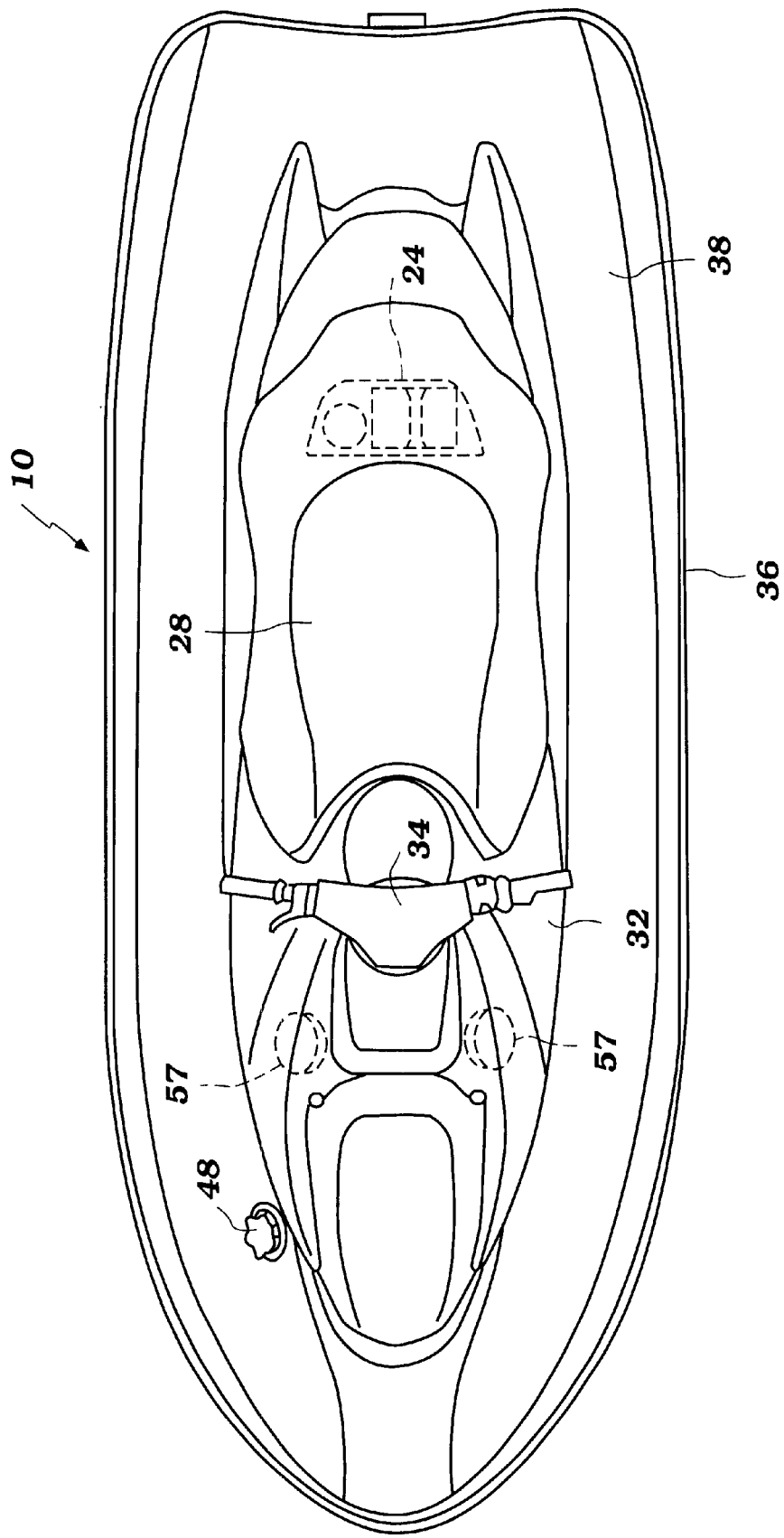
FIG. 2 is a top plan view of the personal watercraft of FIG. 1 with portions of some internal components of the watercraft illustrated in phantom.

With reference initially to FIGS. 1 and 2, a personal watercraft is illustrated which includes a hull design constructed in accordance with a preferred embodiment of the present invention. The personal watercraft is identified generally by the reference numeral 10. The hull design has particular utility with personal watercrafts of the type illustrated; however, the hull design also can be used with other small watercrafts as well. The illustration of the hull design in connection with a personal watercraft therefore merely exemplifies on application of the present hull construction.

The watercraft 10 includes a hull, indicated generally by the reference numeral 12, having a lower hull portion 14 and an upper deck assembly 16. The lower hull portion 14 includes the lower surfaces at the hull 12 and its construction will be discussed in detail later.

The upper deck assembly 16, includes the upper surfaces of the hull 12 and sealingly engages the lower hull 14 around its periphery in any suitable manner. The rearward end of the upper deck assembly 16 defines a storage area 24.

The upper deck assembly 16 has a rider's area 26 on its rear side in which a seat 28, which covers the rear storage compartment 24, is provided for accommodating one or more riders seated in straddle tandem fashion. An upstanding portion 32 of the upper deck assembly 16 is disposed forwardly of the rider's area 26 and is provided with a handlebar throttle assembly 34 for operating the watercraft 10 and its powering internal combustion engine.

A pair of raised gunnels 36 is formed at opposite sides of the rear portion of the upper deck assembly 16 and defines a pair of foot areas 38 into which the riders may place their feet. The foot areas 38 extend longitudinally and open through the rear of a transom 40 to facilitate water drainage and also to permit ease of entry and exit of the watercraft 10 from the body of water in which the watercraft 10 is operating.

The hull 12 defines an engine compartment 42. An internal combustion engine identified by the reference numeral 44 is mounted in the engine compartment 42 underneath the rider's area 26 for powering the watercraft 10. The engine 44 has an induction system (not shown) that draws air into the engine from the engine compartment. A fuel supply system supplies fuel to the engine, and more particularly to one or more charge formers of the engine (e.g., fuel injectors). The fuel supply system includes a fuel tank 48 that is disposed within the hull forward of the engine compartment in the illustrated embodiment. Other locations of the fuel tank 48 are also possible. A filler hose and fuel cock are provided to fill the tank from outside the hull. While the depicted engine is of a three cylinder, in-line type, and operates on a two-cycle combustion principle, the present hull construction can be used with engines having other number of cylinders (e.g., four), other cylinder arrangements and other combustion principles (e.g., four-cycle). In addition, the engine is arranged within the engine compartment 42 such that its output shaft extends generally parallel to a longitudinally extending central axis of the watercraft. It is understood, however, that other arrangements of the engine within the engine compartment are also possible, such as, for example, an engine with a transversely oriented crankshaft or a vertically oriented crankshaft.

The engine 44 also has an exhaust system that exhausts the combustion byproducts. A combination exhaust manifold and expansion chamber 50 is mounted to one side of the engine 44 and extends first in an upwardly direction, around the front of the engine, then rearward and downwardly to connect at its lower end to an exhaust pipe 52. The exhaust pipe 52 in turn connects to a water trap (not shown). A second exhaust pipe connects to the side of the water trap at its rearward end and terminates near the transom 40 of the watercraft 10 for discharging of the exhaust gases from the watercraft 10 into the body of water in which the watercraft 10 is operating. The watercraft may also include additional exhaust silencing devices, as now known in the art.

The engine compartment 42 is also provided with a pair of ventilating ducts 57 which are affixed at their upper ends to the upper deck 16 and supply the engine compartment 42 with atmospheric air for ventilating the engine compartment 42. In the illustrated embodiment, the watercraft includes a pair of ventilation ducts 57 located near the bow of the watercraft. The watercraft also includes one or more ventilation ducts at the rear of the watercraft. Together these ducts supply air to and vent air from the engine compartment.

A tunnel 58 is formed on the underside of the hull portion 14 at its rearward end. The tunnel extends through the rear of the transom 40, as is shown in FIG. 1. A jet propulsion unit, which is identified by the reference numeral 60, is mounted within the tunnel 58 for propelling the watercraft 10. The jet propulsion unit 60 includes an impeller (not shown) which draws water into the jet propulsion unit 60 from the body of water in which the watercraft 10 is operating. The impeller is affixed to an impeller shaft 22 that extends forwardly through a front wall of the tunnel 58 into the engine compartment 42. The impeller shaft in the illustrated embodiment is coupled by a flexible coupling 30 to an engine output shaft 54 for driving the impeller. Other types of transmissions can also be used depending upon the orientation of the engine in the engine compartment.

Water pumped by the impeller is discharged rearward through a discharge nozzle portion 62 of the jet propulsion unit 60. A pivotally supported steering nozzle 64 is supported in registry with the discharge nozzle 62 and is moved by the handlebar throttle assembly 34 for steering of the watercraft 10 in a well known manner.

Figure 3:
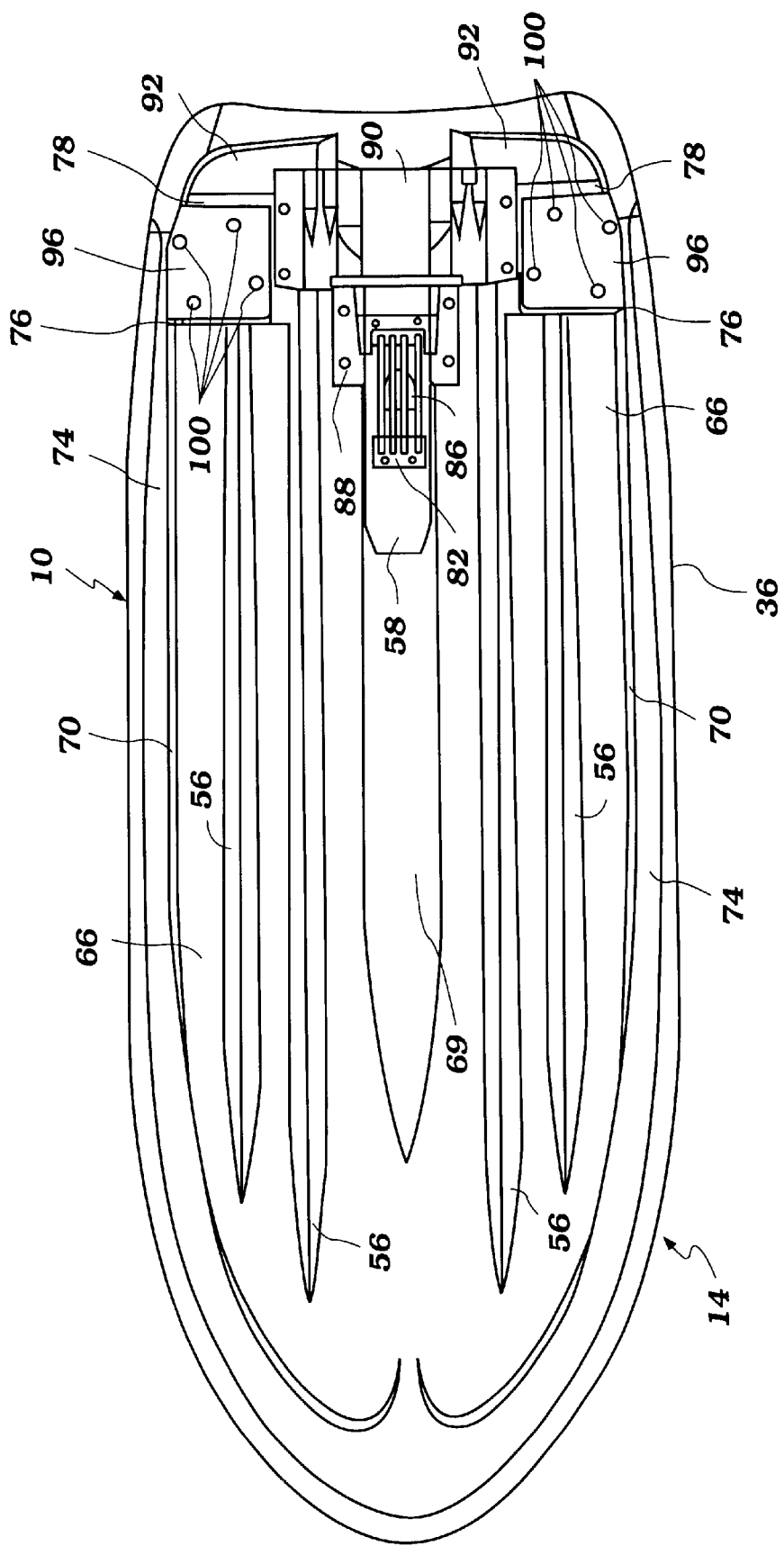
FIG. 3 is a bottom plan view of the personal watercraft of FIG. 1.

The construction of the lower hull 14 will now be discussed in detail. A coordinate system is provided, as illustrated in FIG. 3, in order to ease the description of the present hull design. A longitudinal axis extends between the bow and the stern and a lateral axis extends between the starboard and ports sides, lying perpendicular to the longitudinal axis. A vertical axis extends normal to both the lateral axis and the longitudinal axis.

The lower hull 14 is designed such that the watercraft planes or rides on a minimum surface area of the aft end of the lower hull in order to optimize the speed and handling of the watercraft. With this configuration, the bow or front of the watercraft extends forwardly out of the water at a desired planing angle to the surface of the body of water in which the watercraft is operating.

With additional reference now to FIG. 3, the lower hull section 14 generally has a V-shape formed by a pair of inclined sections 66. Each inclined section 66 extends laterally outward from a longitudinal centerline of the hull to outer chines 70 at a dead rise angle. At least a portion of each inclined sections 66 extends outwardly from a flat keel section 69, and at least a portion of each inclined sections 66, at the rear of the lower hull section 14, extends outwardly from a portion of the tunnel section 58. The inclined sections 66 extend longitudinally from the bow towards the transom 40 of the lower hull 14 and extend laterally to the longitudinally extending side walls 74 which are inclined more steeply than the inclined section 66 and are generally flat and straight near the stern of the lower hull 14 and smoothly bend towards the longitudinal center of the watercraft 10 at the bow. The lines of intersection between the inclined section 66 and the corresponding sidewalls 74 form the outer chines 70 of the lower hull section 14.

A plurality of longitudinally extending strakes 56 are provided on either side of an area between the longitudinal centerline of the lower hull and the corresponding outer chine 70. The strakes 56 affect the handling and ride of the watercraft 10, and may be varied in number, size or shape in order to achieve the desired handling characteristics for the type of watercraft 10 utilizing the presently disclosed hull 12.

A screen plate 82, which is shown in FIG. 3, is affixed to the hull 12 and covering a water inlet opening 86. The impeller draws water through the water inlet opening 86 for propelling the watercraft 10 and the screen plate 82 inhibits relatively large objects from being drawn through water inlet opening 86 and causing damage to the impeller.

A base plate 88 is shown to the rear of the screen plate 82. The base plate 88 is affixed to the hull 12 and spans the tunnel 58. The base plate 88 provides support for the jet propulsion unit 60.

Figure 4:
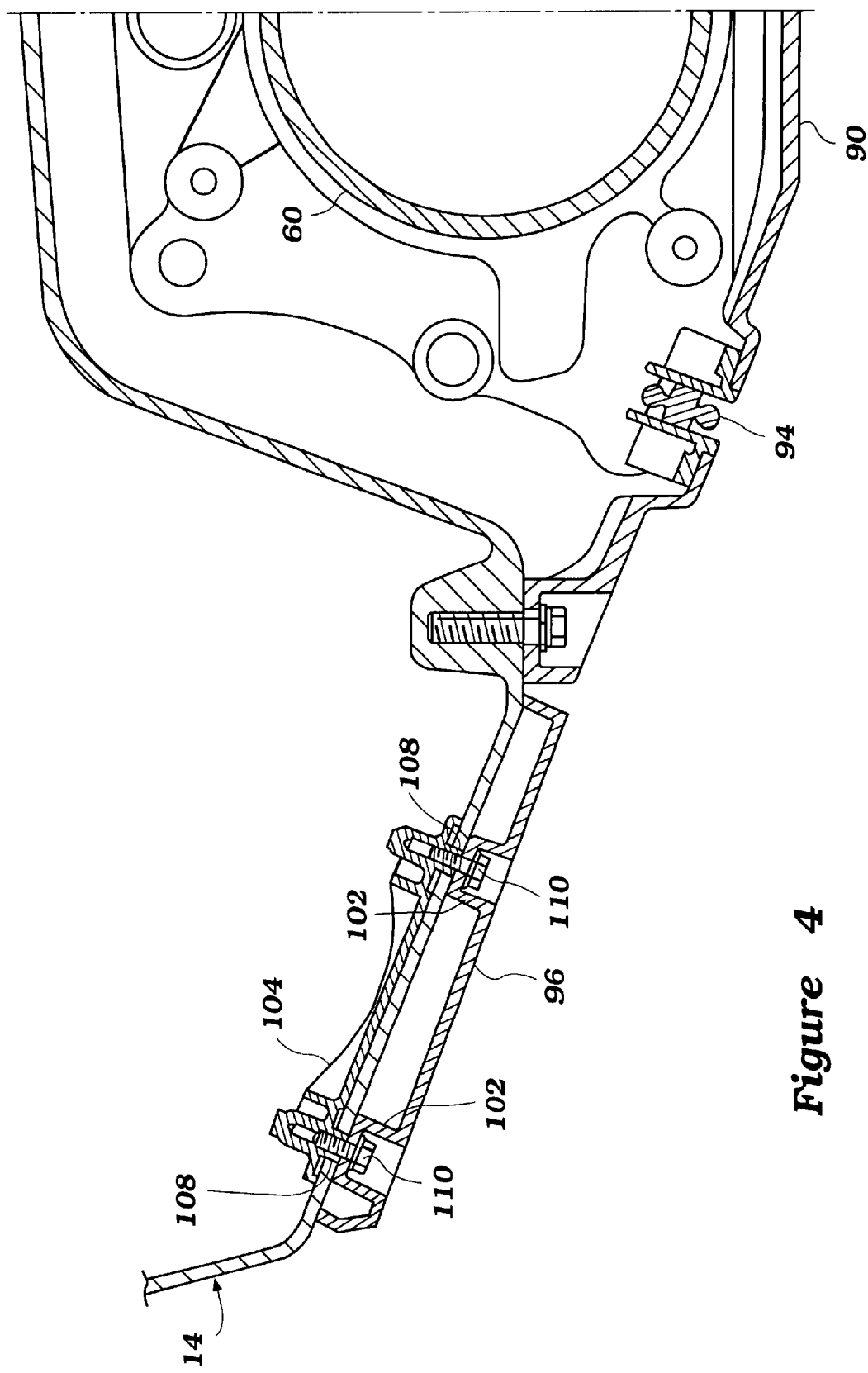
FIG. 4 is a rear view of a partial cross section of the port side of the rear hull of the personal watercraft of FIG. 1.

A ride plate 90 is provided to the rear of the base plate 88. The ride plate 90 is affixed to the hull 12 and additionally spans the tunnel 58. The ride plate 90 is positioned generally below the discharge nozzle 62 and provides a planing surface for the watercraft 10. As shown in FIG. 4, the ride plate 90 of a presently disclosed embodiment is bolted directly to the lower hull 14. The ride plate 90 further includes a sensor 94 for indicating the speed of the watercraft 10.

The aft ends of the inclined sections 66 principally terminate at a first stepper, which is indicated by the reference numerals 76. The first steeper 76 is disposed towards the transom end of the lower hull 14. The first stepper 76 extends upwardly normal to the inclined surfaces 66. The first stepper 76 is bisected at a longitudinally extending center line of the hull 12 by the tunnel 58 formed in the transom 40 for accommodating the jet propulsion unit 60.

The upper ends of the first stepper 76, which are located to the port and starboard of the tunnel 58, terminate at port and starboard first stepper areas 84 that extend between the first stepper 76 and a second stepper 78. The tunnel 58 separates the port and starboard first stepper areas 84. The port and starboard first stepper areas 84 extend generally parallel to the aft ends of the port and starboard incline surfaces 66 and terminate at their inner edges at inclined surfaces 86 that define the longitudinal boundary of the tunnel 58 and at their outer ends at the side walls 74 of the lower hull 14.

As seen in illustrated embodiment of FIG. 3, a pair of step plates 96 are provided, each affixed to, and covering the majority of the port and starboard portions of the first stepper area 84. In the illustrated embodiment, the step plates 96 are made of aluminum, and are preferably die-cast; however, other materials (e.g., composite materials, plastics, etc.) and other manufacture processes (e.g., injection molding) can be used as well. Each of the pair of step plates 96 is spaced rearward from the first stepper 76, defining a gap between a leading edge of the step plate and the first stepper. Each of the step plates 96 is provided with at least one mounting aperture 100, the aperture 100 including a countersink portion 102, as illustrated in FIG. 4. The exposed surface, or the underneath surface when installed on the watercraft 10 of the illustrated embodiment, is substantially smooth and uninterrupted with the exception of four provided mounting apertures 100, as described above.

FIG. 4 is a cross section of the port side of a watercraft hull 12 constructed in accordance with the present invention when viewed from the rear of the watercraft 10 and sectioned along a lateral axis bisecting the step plate 96. A mounting bracket 104 is provided on the inner surface of the lower hull 14. The bracket 104 backs a substantial portion of the step plate 96 and includes threaded apertures 106 corresponding in position with the mounting apertures 100 of the step plate 96. The hull 12 is provided with through-holes 108 corresponding with both the mounting apertures 100 and threaded apertures 106. A bolt 110 is passed through a mounting aperture 100, a through-hole 108 and threaded into a threaded aperture 106. In the presently disclosed embodiment, four such mounting bolts 110 are used in the described manner. The bolts 110 are torqued sufficiently to secure the step plate 96 to the watercraft hull 12. The starboard side step plate 96 is secured in a similar manner. The use of a mounting bracket 104 disperses the stress from the proximity of the through-holes 108 to a larger portion of the hull 12. Alternatively, mounting of the step plate 96 may be done using rivets, adhesives, or other suitable methods.

As shown in FIG.'s. 1 and 3, the second stepper 78 extends upwardly normal to the stepper area 84 and is bisected by the tunnel 58 into port and starboard portions. As seen in FIG. 1, the second stepper 78 has a height that is greater than the height of the first stepper 76, in the illustrated embodiment; however, the present invention can be practiced with hulls in which the second stepper is the same size as or smaller than the first stepper, or in which the hull does not include a second stepper.

The larger height of the second stepper 78 in the illustrated allows for a longer aft end of the deck 16 while minimizing the wetted area of the lower hull 14 when the watercraft 10 is up on plane. The height of the second stepper 78, however, is not too large. The second stepper height desirably is selected such that the aft end of a second stepper area 92 behind the second stepper 78 either contacts or lies just above the surface of the water. In this position, the aft end of the lower hull 14 contacts the water to provide additional pitch stability if the watercraft starts to pitch from the desired planing angle.

The upper end of the second stepper 78 terminates at a second stepper area 92 that is bisected into port and starboard sections by the tunnel 58 and that extends generally parallel to the port and starboard first stepper areas 84 and generally normal to the second stepper 78. As best seen in FIG. 3, the surface area of the second stepper area 92 is significantly less than the surface area of the first stepper area 84 while its length is generally equal to the length A of the first stepper area 84.

As seen in FIG. 3, the second stepper 78 has a smaller lateral width than the first stepper 76. As a result, the watercraft can pivot about the planing surface of the lower hull 14 located near the first stepper 76 when turning without the stepper 78 interfering. The second stepper 78 thus effectively shortens the length of the hull when turning. That is, the watercraft tends to handle more like a smaller hull craft, even though the hull extends well beyond the location of the first stepper 76.

The above-described lower hull 14 functions in the following manner when the watercraft 10 is planing with the bow disposed at the optimum low drag angle relative to the level of the body of water in which the watercraft 10 is operating. The first and second steppers 76 and 78 and first and second stepper areas 84 and 92 increase the effective length of the hull 14 of the watercraft 10 while reducing the overall wetted surface of the lower hull 14. This increases the stability of the watercraft 10, which thus inhibits bow pitching while also reducing the drag of the lower hull 14. The wetted surface of the lower hull 14 is reduced since the second stepper area 92 is at a height above the first stepper area 84 which is sufficiently large to dispose the second stepper area 92 and the aft end 94 of the transom 40 generally above the water line when the watercraft 10 is planing. In static operating conditions the second stepper area 92 provides buoyancy at the aft end of the watercraft 10.

Figure 5:
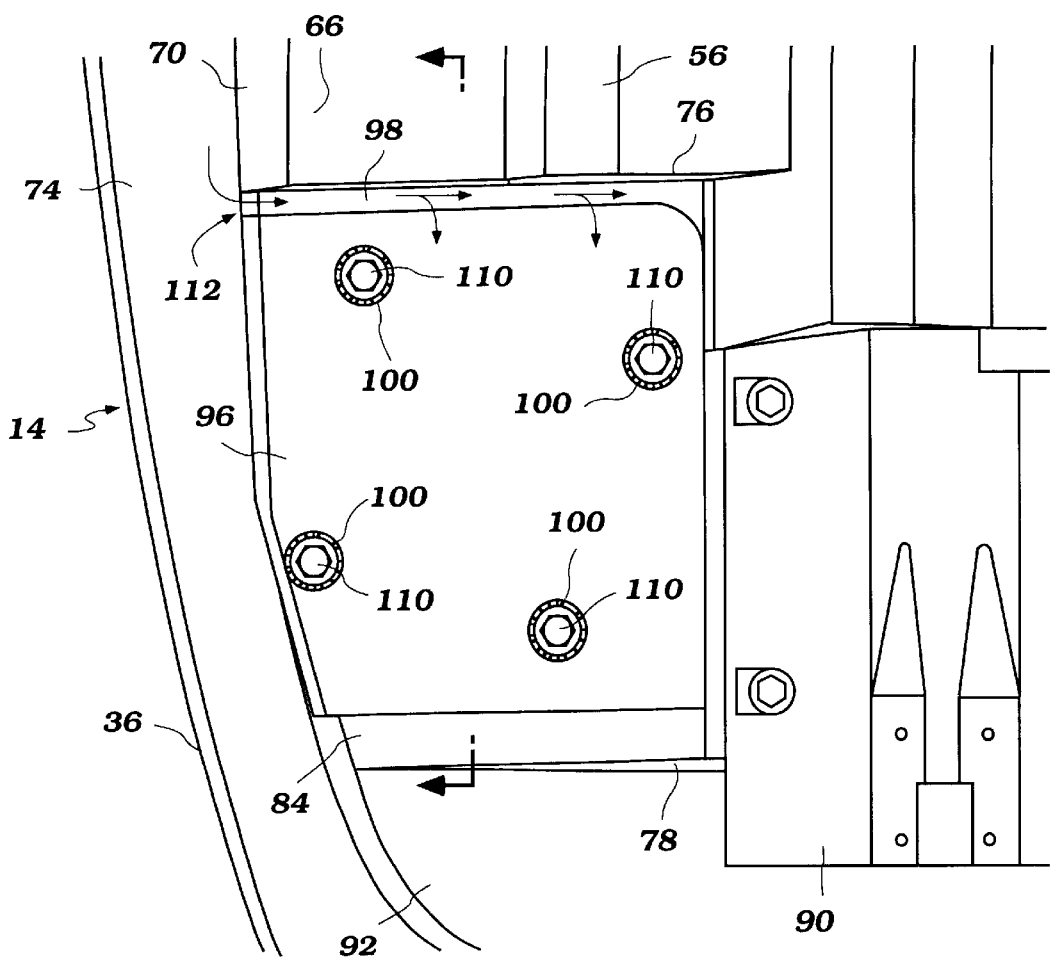
FIG. 5 is a bottom plan view of an enlarged portion of the rear hull of the personal watercraft of FIG. 1.

As illustrated in FIG.'s 5 and 6, the step plates 96 operate to further reduce drag on the aft portion of the watercraft hull 12 when it is up on plane. FIG. 5 shows an underneath surface of the aft starboard side of a watercraft 10 constructed in accordance with the present mode. In the presently illustrated embodiment, a first surface is provided, at least in part, by the underneath surface of an aft portion of the lower hull 14, generally forward of the first stepper 76. A second surface is provided, at least in part, by an underneath surface of the step plate 96 mounted to the first stepper area 84. As described above, a gap 98 is provided between the first and second surfaces, extending from an outer portion of the surfaces to an inner portion of the surfaces. In the illustrated embodiment, the outer portion of the surfaces terminates in an opening 112 to a lateral side of the hull 12, located substantially at the outer chine 70. The step plate 96 fixed to the port side of the hull 12 is substantially a mirror image of the step plate 96 just described.

Figure 6:
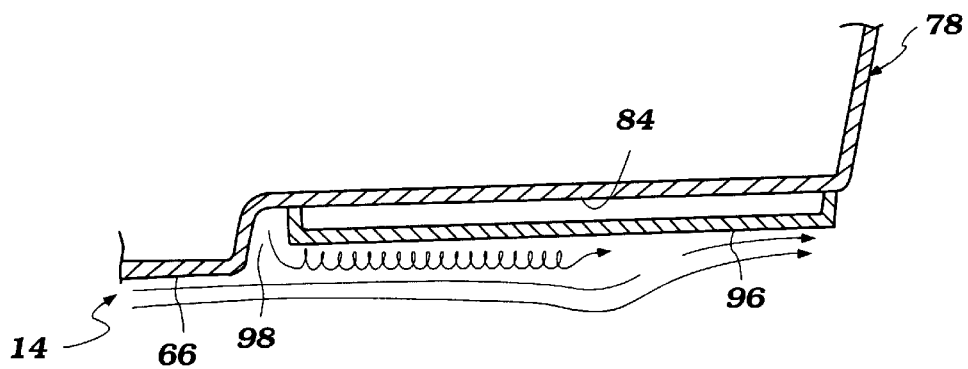
FIG. 6 is a side view of a partial cross section taken along the section lines illustrated in FIG. 5.

When the watercraft 10 is up on plane, the opening 112 is preferably above the surface of the body of water that the watercraft 10 is operating in, allowing air to communicate with the gap 98 through the opening 112. The action of water passing below the first surface, or hull bottom, and then below the gap 98 when the watercraft 10 is planing creates a low pressure condition in the gap 98. This low pressure condition draws air into the gap 98 and results in the air mixing with the water passing below the gap 98 (as depicted by the arrows in FIG. 6), and thus results in an air and water mixture passing below the second surface, or step plate 96. The mixture of air and water passing below the step plate 96 results in less drag on the underneath surface of the step plate 96 in comparison to the drag experienced when water alone passes beneath the underneath surface, thus improving the performance of the watercraft 10.

When the watercraft 10 is turning, the opening 112 is preferably below the surface of the water, thus preventing air from communicating with the gap 98 and from mixing with the water passing below the step plate 96. Therefore, when a watercraft 10 constructed in accordance with the present invention is turning, where drag on the step plate 96 is desirable, the watercraft 10 will advantageously perform as though it does not include such drag reducing features.

Which in this embodiment the gap opens laterally outward at the lateral sides of the watercraft, the gap need not extend entirely to the outer sides of the hull (i.e., to the outer chines of the hull). The gaps, however, should be arranged on the hull so that the outer ends of the gaps are disposed above the surface of the water when the watercraft is up on plane in order to draw air into the gaps. In one preferred mode, the outer end of each gap is also disposed so as to be beneath water when the watercraft turns sharply to the corresponding side of that gap, as noted above. In another variation, air can be continuously supplied to the gap through its outer end under some turning conditions.

Another hull surface arrangement is illustrated in FIG.'s 7 and 8 and is similar in many respects, including both construction and function, to the embodiment described above. Therefore, the same reference numbers will be utilized for members that remain unchanged, and the same reference numeral followed by an "a" suffix will be used when the member has changed from the above described embodiment.

Figure 7:
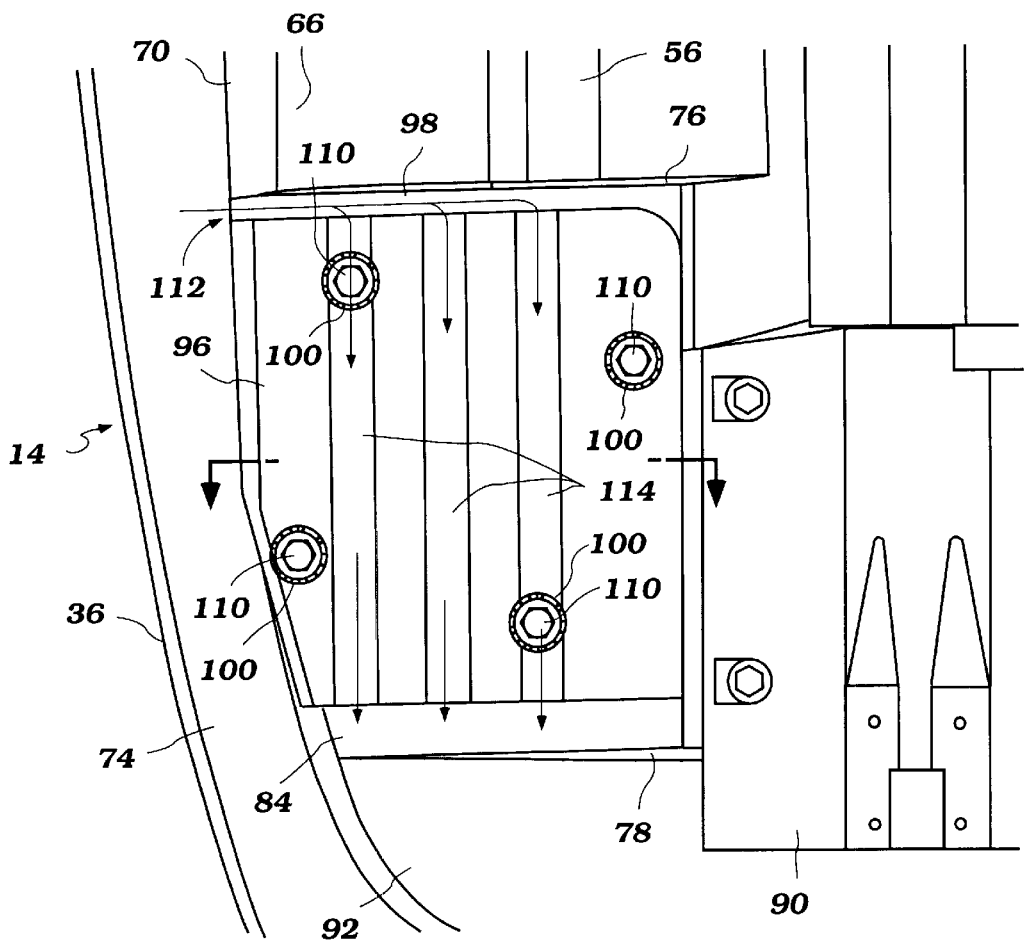
FIG. 7 is a bottom plan view of a portion of the rear hull configured in accordance with an additional embodiment of a personal watercraft hull construction.
Figure 8:
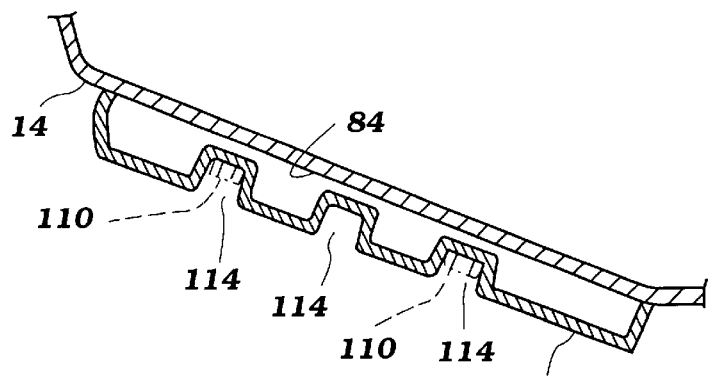
FIG. 8 is a partial cross-sectional view taken along the section lines illustrated in FIG. 7.
Figure 9:
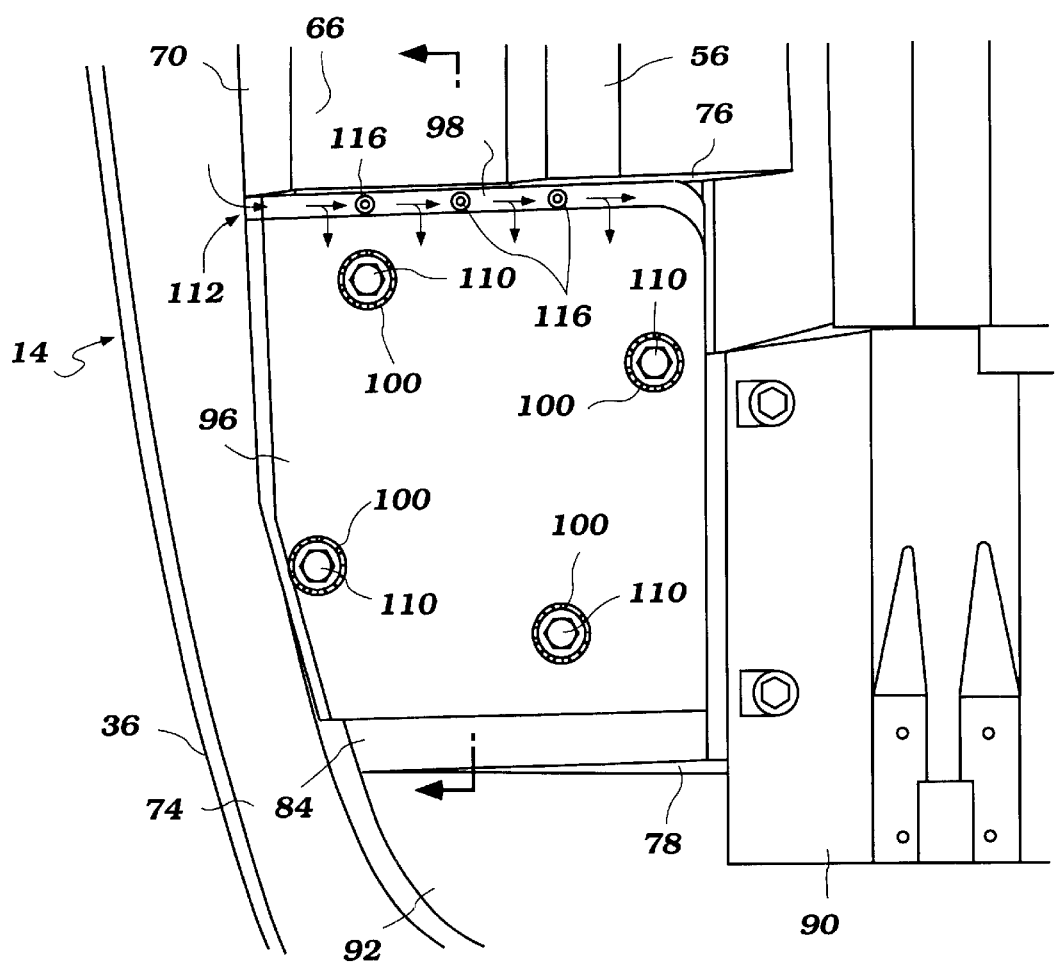
FIG. 9 is a bottom plan view of a portion of the rear hull configured in accordance with another embodiment of the personal watercraft hull construction.

FIG. 7 shows an underneath surface of the aft starboard side of a watercraft 10 constructed in accordance with the present mode. In this embodiment, the step plate 96a includes at least one, but more preferably a plurality of longitudinally extending channels 114. Most preferably, the step plate 96a has three longitudinally extending channels 114. The leading end of the channel 114 preferably communicates with the gap 98 and the aft end of the channel 114 extends longitudinally through the aft end of the step plate 96a. As seen in FIG. 8, the depth of the channels 114 preferably is less than the thickness of the step plate 96a and the channels 114 preferably are unitarily formed with the step plate 96a. In a variation of this construction, the channel(s) can be formed by two or more step plates attached to the same stepper area and arranged in a side-by-side manner.

This embodiment functions in a similar manner to the above-described embodiment. Additionally, the presence of channels 114 effectively reduces the surface area of the step plate 96a, and thus the second surface, thereby reducing drag. The channels 114 also allow a greater quantity of air to be drawn into the gap 98 when the watercraft 10 is up on plane, thus further reducing drag on the step plate 96a. In addition, the channels increase the stability of the watercraft when turning by providing additional edges that cut into the water.

Figure 10:
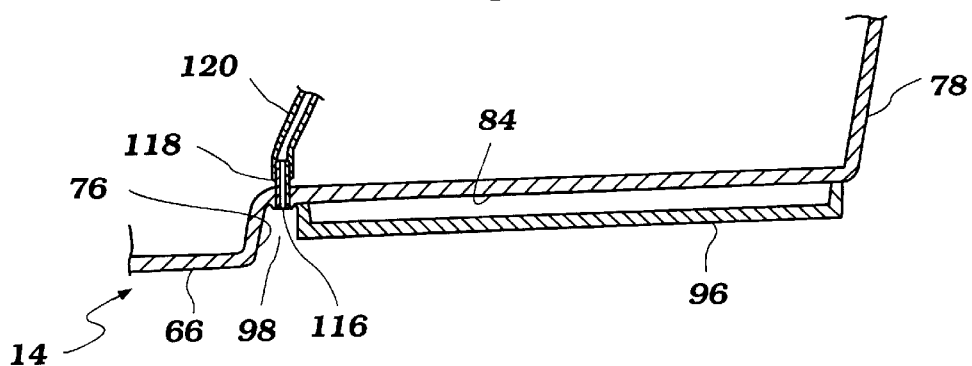
FIG. 10 is a side view of a partial cross section taken along the section lines illustrated in FIG. 9.

An additional embodiment is illustrated in FIG.'s 9 and 10 and includes a step plate 96 with an underneath surface that is substantially smooth and uninterrupted. Additionally, at least one, and more preferably a plurality of apertures 116, and most preferably three apertures 116 are provided in the lower hull 14 of the watercraft 10 in the downward facing surface of the gap 98. As best seen in FIG. 10, a boss 118 is fixed in the aperture 116 for communicating between the inside and underneath surface of the hull 12.

Preferably, connected to the boss 118 is one end of a hose 120 that extends upwardly from the boss 118 and has its other end affixed to a member of the watercraft 10. This member can be disposed within the engine compartment 42 or located on or near the upper deck 16. The member can also be part of the upper deck 16 or a wall of the engine compartment 42. In one mode, the upper end of the hose 120 is attached to a section of the watercraft that is located beneath the removable seat 28. Fixing the hose 120 in such a manner will inhibit water from entering the hose 120 though its upper end, allowing only air to enter the upper end of the hose 120 and communicate with the gap 98. The upstanding-orientation of the hose also inhibits a back flow of water through the hose into the engine compartment or the riders area.

When the watercraft 10 is up on plane, the low pressure condition in the gap 98 will draw air into the upper end of the hose 120, through the hose 120 and into the gap 98, resulting in a reduction in drag similar to the above described embodiments. Preferably, the air drawn through the plurality of hoses 120 is supplemental to the air drawn from the opening 112, thus allowing drag to be reduced to a greater extent than the above described embodiments. This construction can be used, however, as the sole source of air to the gaps.

Figure 11:
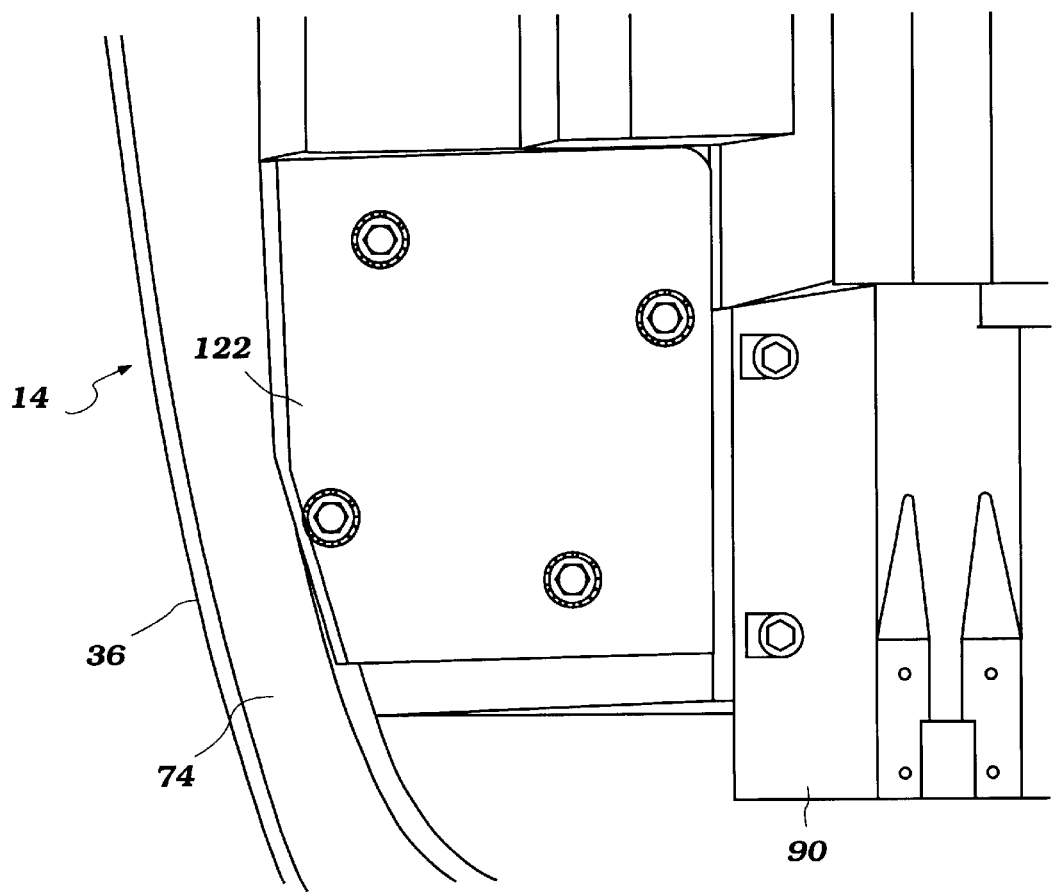
FIG. 11 is a bottom plan view of a portion of the rear hull of a prior watercraft.

FIG. 11 illustrates a step plate 122 of the prior art. This step plate 122 is affixed to the hull 12 in a manner so that its leading end is abutting the first stepper 76. A step plate 122 of this design is functional to incrementally adjust handling characteristics of a singular hull 12 for use with several different engine sizes or types of watercraft.

By spacing the step plate away from the first or front stepper, the gap is formed to provide the drag-reducing effect discussed above. The size of the gap in each of the above-described embodiments is sufficient to provide the desired venturi effect. If the size of the gap is too small, the pressure within the gap will not be lowered to a sufficient extend to overcome the fluid drag through the gap. For this purpose, the gap should be visible to inspection when viewing the hull from below. In an exemplifying embodiment, the gap is at least 0.5 cm in width (as measured in the longitudinal direction) and can be larger (e.g., 1 cm). These dimensions, however, are merely examples and the gap size can be readily tailored by those skilled in the art to produce the desired amount of airflow beneath the step plates.

Although this invention has been disclosed in the context of certain preferred embodiments and examples, it will be understood by those skilled in the art that the present invention extends beyond the specifically disclosed embodiments to other variations and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A hull for a planing-type watercraft, the hull including a pair of inclined sections arranged generally in a V-shape, the inclined sections extending generally along a longitudinally extending center line of the hull from a front portion of the hull toward a rear portion of the hull, the hull further including at least a first arrangement of surfaces, the first arrangement of surfaces including a first surface and a second surface, the second surface positioned rearward of the first surface so as to create a gap between the first and second surfaces, wherein the gap extends from an outer portion of the surfaces to an inner portion of the surfaces generally in a lateral direction normal to the center line of the watercraft, additionally comprising a second arrangement of surfaces positioned on an opposite side of a longitudinally extending centerline of the hull from the first arrangement of surfaces, wherein a ride plate is attached to the hull and at least a portion of the ride plate is disposed between the first arrangement of surfaces and the second arrangement of surfaces.

2. A jet propelled watercraft comprised of a hull, a jet propulsion unit mounted in the hull and having a downwardly facing water inlet opening through which water is drawn, an impeller, an engine for driving the impeller to draw water through the inlet opening, and a discharge nozzle through which the water is discharged, the hull further comprising an upper deck and lower hull, the lower hull defining at least in part an engine compartment for housing the engine, and the lower hull including at least a first arrangement of surfaces, the first arrangement of surfaces disposed rearward of the water inlet opening and including a first surface and a second surface, the second surface positioned rearward of the first surface so as to create a gap between the first and second surfaces, and the lower hull further including a source of air communicating with the gap.

3. The jet propelled watercraft of claim 2, wherein the source of air comprises an open lateral end of the gap disposed toward a lateral side of the hull.

4. The jet propelled watercraft of claim 3, wherein the open end is located in proximity to an outer chine of the hull.

5. The jet propelled watercraft of claim 3, wherein the open end is located on the hull so as to be above the water surface when the watercraft is up on plane.

6. The jet propelled watercraft of claim 4, wherein the open end is located on the hull so as to be below the water surface when the watercraft is turning.

7. The jet propelled watercraft of claim 2, wherein the source of air comprises at least one aperture in the hull between the first and second surfaces.

8. The jet propelled watercraft of claim 7, wherein a hose is provided with a first end of the hose connected to the aperture and a second end of the hose fixed to an upwardly disposed member of the watercraft.

9. The jet propelled watercraft of claim 8, wherein the member is located within the engine compartment.

10. The jet propelled watercraft of claim 8, wherein the member is affixed to the deck.

11. The jet propelled watercraft of claim 7, wherein the source of air further comprises an open lateral end of the gap disposed toward the lateral side of the hull.

12. The jet propelled watercraft of claim 2, wherein a ride plate is affixed to the lower hull and substantially covers the discharge nozzle.

13. The jet propelled watercraft of claim 12, further comprising a second arrangement of surfaces, wherein at least a portion of the ride plate is positioned between the first and second arrangement of surfaces.

14. A step plate for use on a planing watercraft hull having at least one stepper formed in a lower portion of the hull, at least one stepper area formed on an aft side of the stepper, and a ride plate mounted to the hull in a central rearward location, the step plate having at least one longitudinally extending channel, and the step plate being adapted to be mounted to the stepper area on either side of the ride plate.

15. The step plate as in claim 14, wherein the step plate is mounted relative to the stepper so that a leading end of the step plate and the stepper define, at least in part, a gap.

16. The step plate as in claim 15, wherein the channel communicates with the gap.

17. The step plate as in claim 14, wherein the channel extends through an aft end of the step plate.

18. The step plate as in claim 14, wherein the depth of the channel is less than the thickness of the step plate.

19. The step plate as in claim 14, additionally comprising at least one additional channel so as to have a plurality of channels.

20. The step plate as in claim 19, wherein the step plate includes three channels.

21. The step plate as in claim 14, wherein the step plate is mounted to the hull through use of a mounting bracket on an inner surface of the lower hull.

22. A jet propelled watercraft comprised of a hull, a jet propulsion unit mounted in the hull, and an engine for driving the jet propulsion unit, the hull further comprising an upper deck and lower hull, a stepper formed on an aft end of the lower hull, a stepper area being formed on the aft side of the stepper, the hull further including a tunnel bisecting the stepper and the stepper area, and at least a first step plate positioned relative to the stepper area so as to draw air top undersurface of the hull.

23. The jet propelled watercraft of claim 22, wherein the step plate is positioned relative to the stepper area so as to prevent air from being drawn to the undersurface of the hull when the watercraft is turning.

24. The jet propelled watercraft of claim 23, wherein the undersurface of the hull comprises an undersurface of the step plate.

25. The jet propelled watercraft of claim 22, wherein a ride plate is affixed to the hull and spans the tunnel.

26. The jet propelled watercraft of claim 25, further comprising a second step plate, wherein the ride plate is positioned substantially between the first and second step plates.

* * * * *